US005635913A

United States Patent [19]

Willmott et al.

[11] Patent Number: 5,635,913

[45] Date of Patent: Jun. 3, 1997

[54] REMOTE ACTUATING APPARATUS WITH LONG AND SHORT OPERATING CODES

[75] Inventors: Colin B. Willmott, Buffalo Grove; Carl T. Heitschel, Downers Grove, both of Ill.

[73] Assignee: The Chamberlain Group, Inc., Elmhurst, Ill.

[21] Appl. No.: 588,907

[22] Filed: Jan. 19, 1996

Related U.S. Application Data

[63] Continuation of Ser. No. 461,438, Jun. 5, 1995, abandoned, which is a continuation of Ser. No. 375,179, Jan. 18, 1995, abandoned, which is a continuation of Ser. No. 83,202, Jun. 25, 1993, abandoned, which is a continuation of Ser. No. 935,654, Aug. 26, 1992, abandoned, which is a continuation of Ser. No. 552,769, Jul. 16, 1990, abandoned.

[51] Int. Cl.$^{6}$ .................................................. H04Q 1/00

[52] U.S. Cl. ................................ 340/825.22; 340/825.69

[58] Field of Search ......................... 340/825.22, 825.06, 340/825.07, 825.52, 825.53, 825.47, 310.01, 825.69, 825.72

[56] References Cited

U.S. PATENT DOCUMENTS

| | | | |
|---|---|---|---|
| 4,418,333 | 11/1983 | Schwarzbach et al. | 340/825.07 |
| 4,454,509 | 6/1984 | Buennagel et al. | 340/825.07 |
| 4,623,887 | 11/1986 | Welles, II | 340/825.57 |
| 4,626,848 | 12/1986 | Ehlers | 340/825.69 |
| 4,633,247 | 12/1986 | Hegeler | 340/825.52 |
| 4,695,839 | 9/1987 | Barbu et al. | 340/825.07 |
| 4,703,359 | 10/1987 | Rumbolt et al. | 358/194.1 |
| 4,750,118 | 6/1988 | Heitschel et al. | 364/400 |
| 4,754,255 | 6/1988 | Sanders et al. | 340/64 |
| 4,755,792 | 7/1988 | Pezzolo et al. | 340/825.06 |
| 4,802,114 | 1/1989 | Sogame | 364/900 |
| 4,807,052 | 2/1989 | Amano | 340/825.22 |
| 4,825,200 | 4/1989 | Evans et al. | 341/23 |
| 4,831,509 | 5/1989 | Jones et al. | 364/167.01 |
| 4,845,491 | 7/1989 | Fascenda | 340/825.47 |
| 4,847,542 | 7/1989 | Clark et al. | 318/560 |
| 4,856,081 | 8/1989 | Smith | 455/151 |
| 4,905,279 | 2/1990 | Nishio | 380/9 |

FOREIGN PATENT DOCUMENTS

| | | | |
|---|---|---|---|
| 0162327 | 11/1985 | European Pat. Off. | G08C 19/28 |

*Primary Examiner*—Brian Zimmerman

*Attorney, Agent, or Firm*—Fitch, Even, Tabin & Flannery

[57] ABSTRACT

A garage door opening system comprises a receiver which is responsive both to security codes in a first format from existing transmitters and to security codes in a new and more secure format from new transmitters. The old format comprises a synchronization character and ten code words and the new code format advantageously comprises twenty code words with a new synchronization character between the tenth and eleventh code words. The receiver determines from the received synchronization codes the type of format being received and compares the received code words with stored permitted code words of the same type. When a match occurs, an activation signal is generated.

8 Claims, 5 Drawing Sheets

REMOTE ACTUATING APPARATUS WITH LONG AND SHORT OPERATING CODES

This application is a continuation of application Ser. No. 08/461/438, filed Jun. 5, 1995, which is a Continuation of application Ser. No. 08/375,179, filed Jan. 18 1995, which is a Continuation of application Ser. No. 08/083,202, filed Jun. 25, 1993, now abandoned, which is a continuation of application Ser. No. 07/935,654, filed Aug. 26, 1992, which is a continuation of application Ser. No. 07/552,769, filed Jul. 16, 1990 all abandoned.

BACKGROUND OF THE INVENTION

The present invention relates to remote actuating apparatus and more particularly, to improvements in security coding provided by such apparatus.

Remote actuating apparatus such as automatic garage door openers, comprise remote transmitters and a receiver which responds to signals from the transmitters to generate actuating signals thereby opening a door. The receivers of such arrangements provide security in their operation by actuating only when a properly transmitted request is received which matches one of a small number of allowable security codes. The security codes are used to deny access by miscreants and to limit the possibility that someone with a similar transmitter will erroneously open garage doors other than his or her own.

Modern remote actuation systems provide for tens of thousands of unique security codes and the probability of a neighbor using the same code or of a potential criminal "breaking" a code are relatively small. Consumer demands for security improvements are growing, however. One possible response to such demands is to increase the number of coded characters in the security codes. This improves security, but it creates a number of additional problems. One problem comes about from the security code set up arrangements of today's door openers. Most rely on the set up by a user of a number of tiny switches in each transmitter. When the number of code characters is increased, the number of switches to be provided also increases, causing physical design problems in the transmitter and given the size of the switches makes the system more difficult to set up by the user.

An alternative to providing switched code settings in transmitters is to assign each transmitter a unique code which is unchangeably stored in the transmitter. Such a permanent code, when combined with a programmable receiver, as is disclosed in C. Heitschel, et al., U.S. Pat. No. 4,750,118; makes set up an easy task but it makes impossible the selective use of a single transmitter with more than one receiver when the receivers are physically close enough that they both receive the same transmissions. A need exists for a remote actuating system which provides set up convenience, but in which a single transmitter can operate selectively with multiple receivers.

Adding to the number of security code characters also requires a new transmission and reception format. The adoption of a new format without proper consideration for the old format makes obsolete many old transmitters. Such forced obsolescence is not desirable. Accordingly, a need exists for a new coding format which permits the desired increases in security, while at the same time is compatible with equipment which is presently in the hands of consumers.

SUMMARY OF THE INVENTION

The present invention is directed to a remote actuating system which operates with first transmitters repetitively transmitting a first code sequence comprising a first frame of code words and with second transmitters for repetitively transmitting second code word sequences including both a first frame of code words and a second frame of code words. Each first frame of code words includes a first identity character identifying it as a first frame and a predetermined number of code words and each second frame comprises a second identity character, identifying a second frame, and the same predetermined number of code words on the first frame. A receiver for operation with this system stores at least one first code word sequence including the predetermined number of code words and at least one second code word sequence storing twice the predetermined number of code words. These stored code word sequences comprise the permitted code word sequences. When a first frame of code words is received, it is held in storage until another frame of code words is received. When the other code word sequence is determined to be a first frame, then two first frames have been received successively, indicating that the incoming code word sequence is a first code word sequence and an actuation signal is generated when the received first frame matches a first code word sequence stored in the receiver. Alternatively, when the other frame of code words is determined to be a second frame of code words, the code words of the first and second received frames are compared with the second code word sequences stored in the receiver and an actuation signal is generated when a match occurs.

Advantageously, the identity character of each first frame is different from the identity character of each second frame and received frames of code words are distinguished by analyzing the identity characters associated therewith.

A transmitter to be used in this arrangement consists of a pre-programmed source of code words and a transmitting arrangement which transmits a first synchronizing character followed by a second predetermined number of code words. Then, after a pause in transmission, the transmitter transmits a second synchronizing character followed by a third predetermined number of code words where the sum of the second and third predetermined numbers of code words equals the total number of code words to be transmitted. In an embodiment of the invention, the total number of code words transmitted is twice the number of code words in a sequence provided by the old type transmitters. Accordingly, a receiver can successively receive two old words utilizing the same circuitry as receiving a single new code word sequence. Also, in the present arrangement the first synchronizing signal is the same as the old transmitter synchronizing signal, while the second synchronizing signal is different from the first signal. The synchronizing signals of received code word sequences are analyzed to determine whether two old type code words have been received or a single new type code word including non-identical synchronization signals has been received.

In an additional embodiment of the invention, the code word sequence transmitter includes an arrangement for permanently storing a predetermined number of code words and a plurality of operator controllable switches for controlling at least one additional code word. When a code word sequence is transmitted, it comprises both the permanently stored code words and the additional code words identified by the switches. By using a combination of pre-stored code words and switch controlled code words, this structure provides the new type of long code sequences but still permits variability in the code word sequences transmitted. When the switch controlled code words are determined by switches which can easily be accessed by the operator, this arrangement permits the use of a single transmitter to selectively actuate multiple receivers, even when those multiple receivers receive the same transmitted code word sequences from the transmitter.

DETAILED DESCRIPTION OF THE PREFERRED EMBODIMENT

Figure 1:
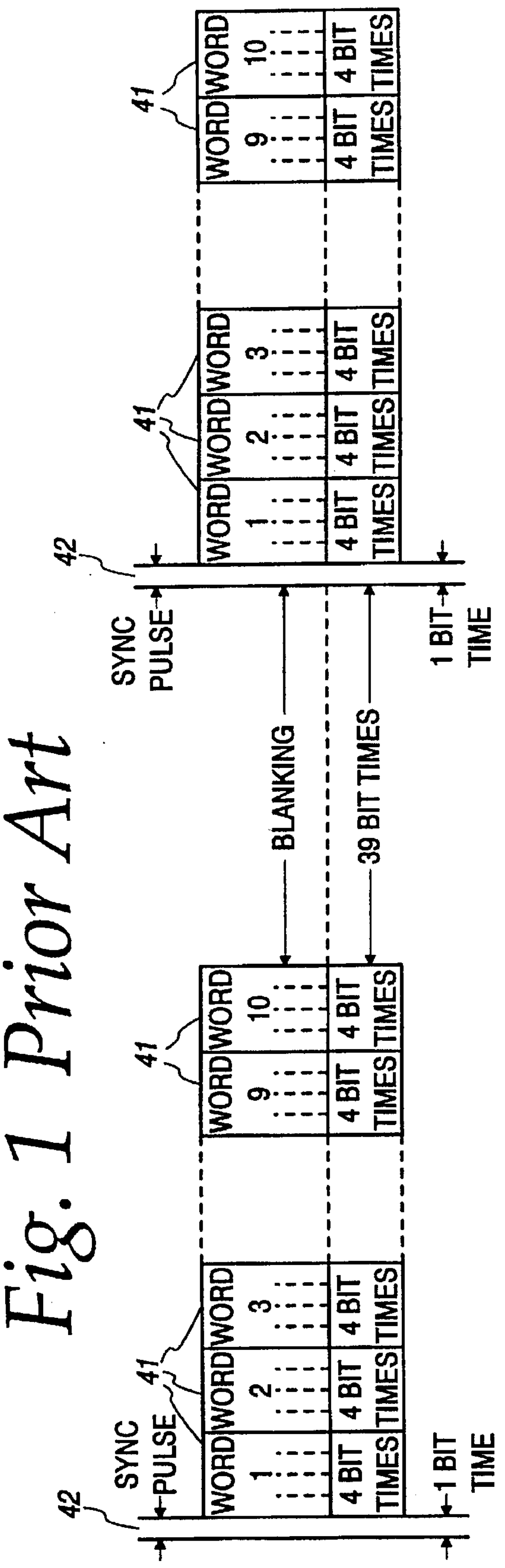
Fig. 1 Prior Art
FIG. 1 is a representation of an existing garage door opener code character format.

Before discussing the embodiments of the present invention which are compatible with both an "old" security code format and a "new" security code format, a discussion of the old code format is appropriate. FIG. 1 is a representation of the old coding format. With the old format, ten code words 41 make up the security code proper. Each of the code words 41 comprises 4-bits which are used to convey one of three code designations. The coding of these three designations, which are labelled A, B and C is shown in Table 1. Since each of the code words 41 indicates one of three states and ten such words exist in a code sequence, approximately 59,000 unique code word sequences can be created with the old coding format.

TABLE 1

| CODE WORD REPRESENTATIONS | | | | |
|---|---|---|---|---|
| Code | Transmitted Code | | | |
| Character | Bit-1 | Bit-2 | Bit-3 | Bit-4 |
| A | 0 | 0 | 0 | 1 |
| B | 0 | 0 | 1 | 1 |
| C | 0 | 1 | 1 | 1 |

The code words are transmitted from a transmitter to a receiver using RF signals and each sequence of code words begins with a single logic one synchronization pulse 42. After the transmission of a complete ten word code sequence, a blanking interval is produced by the transmitter of approximately 39-bit intervals, then the entire code sequence beginning with the logic one synchronization pulse 42, is repeated. Transmission in this manner results in a continuing sequence of transmitted code sequences, each separated by 39 blank bit times and each beginning with a logic one synchronization pulse 42. A receiver for this code format recognizes the format by the presence of the synchronization pulse 42 following a blanking interval and records each successive sequence of ten code words. As is well known in the art, multiple repetitions of the same code word sequence are received before the code word sequence is determined to have been received correctly.

Figure 2:
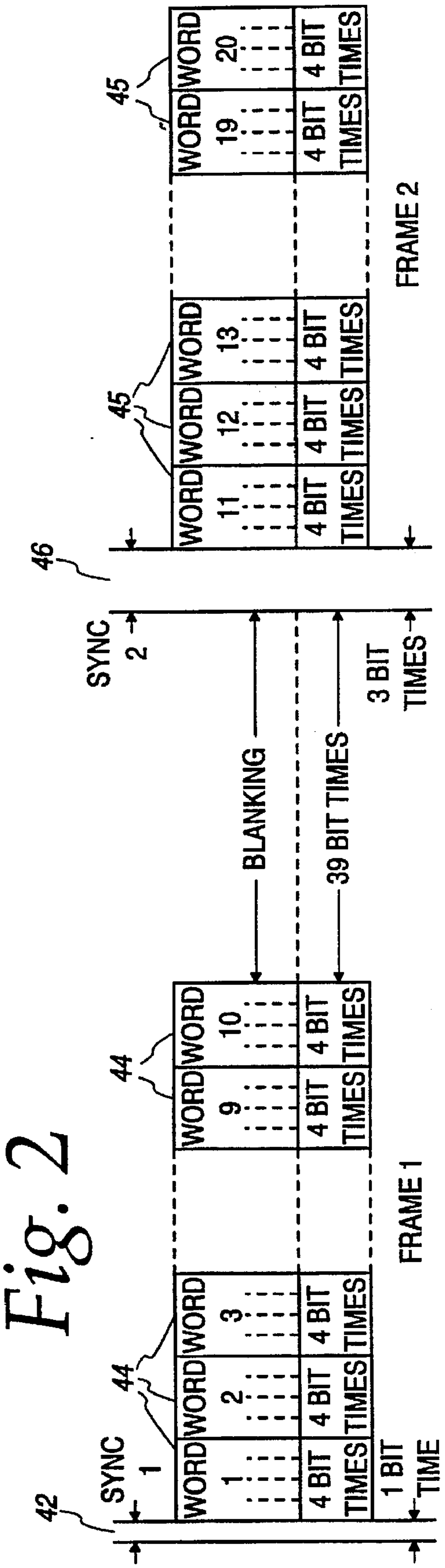
FIG. 2 represents a new code character format in accordance with one embodiment of the present invention.

FIG. 2 represents a new code sequence of the present embodiment. The new sequence of FIG. 2 comprises two frames of code words where a frame 1 consists of code words 1 through 10 and frame 2 consists of code words 11 through 20. In FIG. 2, the code words of frame 1 are denoted 44 and those of frame 2 are denoted 45. A code sequence of 20 three state code words as shown in FIG. 2 permits in excess of three billion unique code combinations.

New code sequences are transmitted in a manner different from the old code sequences. Each frame 1 is transmitted using substantially the same format as each frame of the old system and begins with a logic one synchronization pulse 42 and ends with a blanking interval of approximately 39-bit times. Each frame 2, however, is transmitted at the end of the blanking interval and begins with a synchronization 2 signal 46 which comprises three consecutive logic ones. At the conclusion of the transmission of a frame 2, another blanking interval is enforced followed by repetitive transmissions of frame 1 and frame 2, each separated by a blanking interval and each frame 2 beginning with a 3bit synchronization signal 46.

Figure 4:
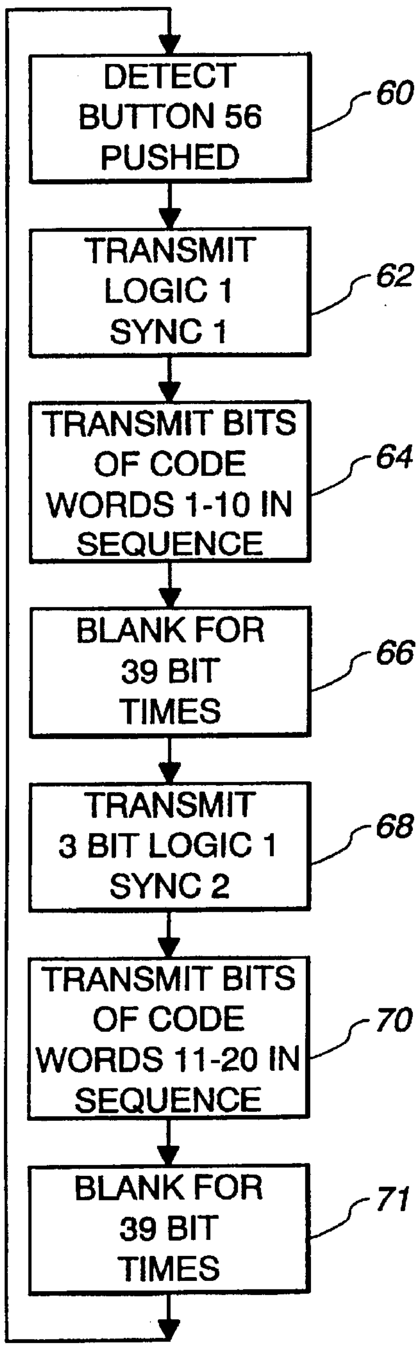
FIG. 4 is a flow diagram of the transmitter of FIG. 3.
Figure 3:
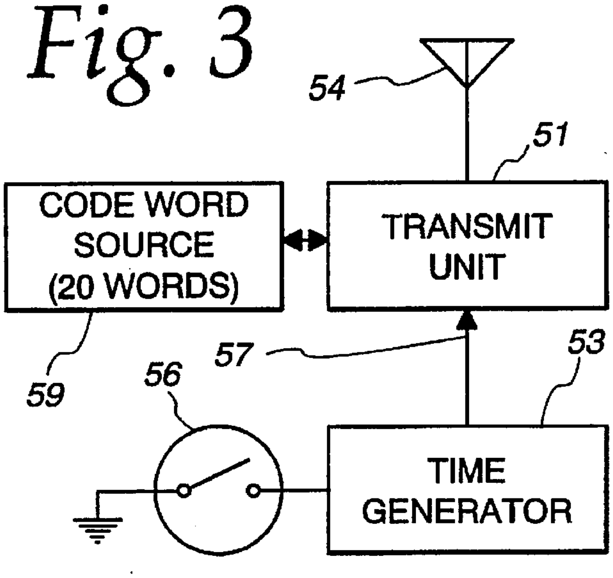
FIG. 3 is a block diagram of a transmitter of an embodiment of the invention.

FIG. 3 is a block diagram representation of a transmitter for transmitting code sequence signals of the type shown in FIG. 2. A transmit unit 51 operates in accordance with signals from a time generator 53 to read permanently stored code words from a code word source 59 and convert them into RF signal bursts which are transmitted to the receiver (FIG. 5) via an antenna 54. The transmitter of FIG. 3 is normally at rest. When an operator wishes to transmit a code, that operator presses a push-button 56 to which timing generator 53 responds by generating a continuing sequence of clock pulses at the rate of approximately one pulse per millisecond. These clock pulses are applied to transmit unit 51 via a conductor 57 and control the reading and transmission of code words. FIG. 4 is a flow diagram of the operation of the transmitter of FIG. 3 and is discussed in conjunction with the operation of the transmitter of FIG. 3.

The sequence shown in FIG. 4 begins at block 60 with the detection of the closure of push-button 56. Pressing button 56 causes time generator 53 to generate a recurring sequence of timing pulses at the rate of one per millisecond. In response to a first timing pulse, transmit unit 51 transmits via antenna 54, a logic one, synchronization 1 signal of 1bit time duration (one millisecond). At this time, transmit unit 51 also begins to read code words from a code word source 59 over a communication path 58. In block 64, the code words read from code word source 59 are transmitted in sequence at the rate of 1 code word bit per clock time until the last bit of the tenth code word has been transmitted. At the end of transmission of the tenth code word, transmit unit 51 blanks all transmission for 39 bit times (block 66). Transmitter 51 terminates the blanking interval by transmitting a synchronization 2 signal consisting of three consecutive logic ones (block 68). At the conclusion of the transmission of the synchronization 2 signal, code words 11 through 20 which are accessed from code word source 59 are transmitted in a manner substantially identical to the transmission of code words 1 through 10. At the conclusion of the transmission of code words 11 through 20, the flow diagram proceeds to block 71 where another blank interval of 39-bit times is inserted and the flow proceeds back to block 60 where a determination is made of the state of push-button 56. If push-button 56 is still closed, the sequence 60 through 71 repeats itself. Since the time required to transmit both code word frames 1 and 2, and both blanking intervals is only 182-bit times (182 milliseconds), normal human interaction with push-button 56 results in multiple transmissions of the entire 20 code word code sequence. In order to control the minimum number of times that the code sequence is transmitted, time generator 53 may include a delay device, such a mono stable multi-vibrator (not shown) which keeps timing generator 53 operational for a predetermined period of time, regardless of the time the button 56 is actually held down. Such preset operation of timing generator 53 assures that a minimum number of code word sequences is transmitted for each push of button 56.

In the present embodiment, code word source 59 comprises a memory storing the 4-bit codes of the type shown in Table 1. This memory replaces the operator controlled switches of prior arrangements. Since twenty 3state code words are used in the present embodiment, in excess of three billion possible codes are represented. With such a large number of possible codes, the code word sequences of all transmitters can be virtually guaranteed to be distinct.

The code word sequences transmitted from the transmitter of FIG. 3 are received by the antenna 74 of the receive unit (FIG. 5) and conveyed to a receiver 73. Receiver 73 conveys the received signals to a decoder 76 which converts them to the on-off format shown in Table 1 and applies them to a control unit 7. Control unit 78 compares the received codes with permitted codes stored in a memory 79 and, when a match is found, enables door apparatus 81 via a conductor 82. The permitted codes stored in memory 79 are recorded therein during a receiver programming mode which is initiated by the press of a program switch push-button 84.

Figure 5:
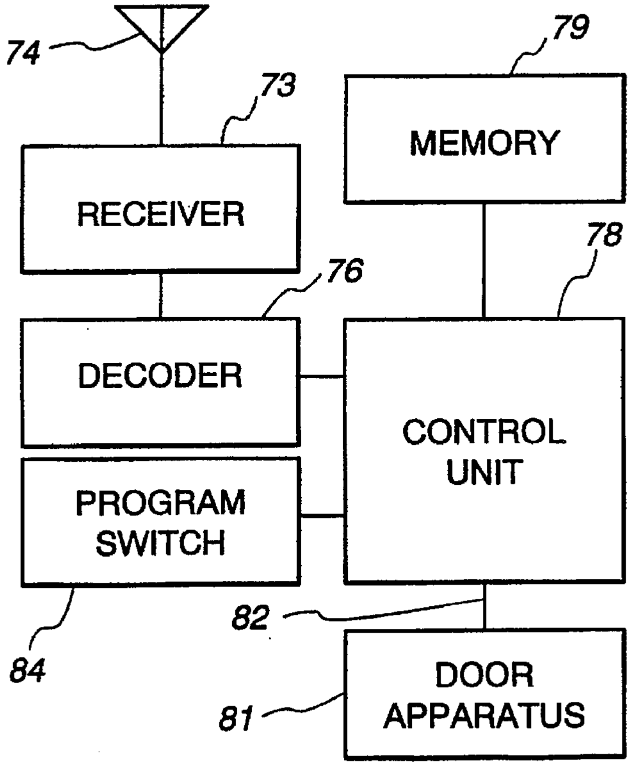
FIG. 5 is a block diagram of a code character receiver for use with the transmitter of FIG. 3.
Figure 6:
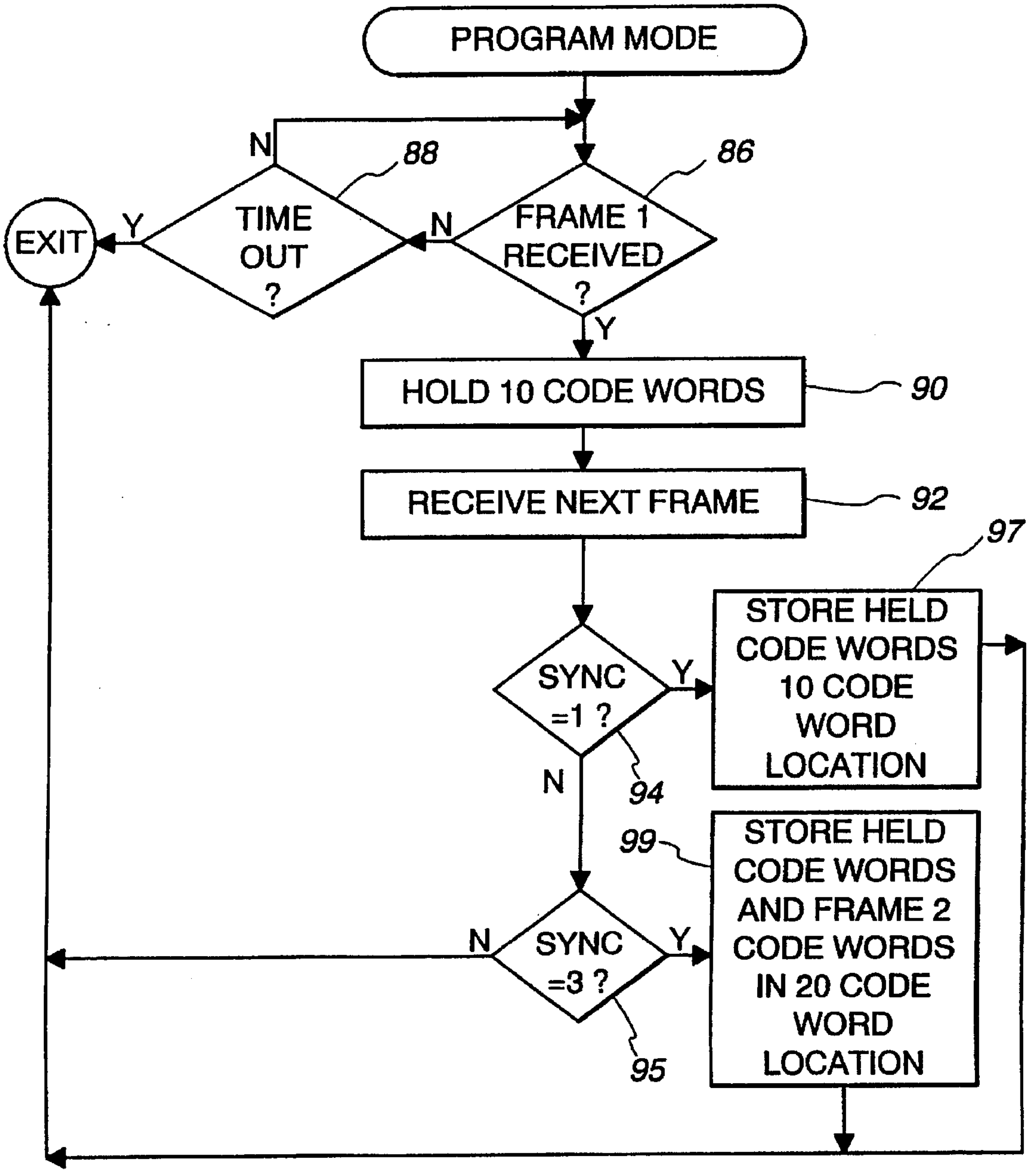
FIG. 6 is a flow diagram of a self-programming mode of operation for the receiver of FIG. 5.

Pressing switch 84 puts control unit 78 in the programming mode shown in the flow diagram of FIG. 6. In the programming mode, the transmitter or transmitters to be used with the subject receiver are individually enabled to transmit their respective security codes to the receive unit of FIG. 5 which receives those security codes and stores them as permitted codes in memory 79. When program switch 84 is initially depressed, control unit 78 enters block 86 where it awaits the reception of a first frame 1 of code words from decoder 76. Control unit 78 determines in block 86 that a frame 1 is received by analyzing the number of bits in the received synchronization signal. It should be mentioned that either a frame one of the new coding format (FIG. 2) or any frame of the old coding format (FIG. 1) is determined in block 86 to be a frame 1. When no frame 1 is received within a period of time determined in block 88, the receive unit of FIG. 5 exits the program mode and returns to a mode of awaiting an incoming code for door actuation purposes. If 3bits are received in block 86 as the synchronization signal, a frame 2 was actually received and the flow returns to the beginning to await a frame 1.

When a frame 1 is received in block 86, the ten code words of that frame are held in storage in block 90 and the immediately subsequent frame is received in block 92. After a next frame is received in block 92, the flow proceeds to block 94 to determine if the synchronization signal received in block 92 comprises a single logic one. When the received synchronization signal comprises a single logic one, then a 10-bit code sequence (old security code) is being received and the flow proceeds to block 97 where the ten code word sequence is stored in a location of memory 79 allocated to ten code words. After the storage of the received ten code words, the receive unit exits the program mode.

When the performance of block 94 indicates that the received synchronization signal does not contain one logic one, a block 95 is performed to determine if the synchronization signal comprises three logic ones. A synchronization code of 3 logic ones indicates the reception of a frame 2 of code words 11 through 20. When the received synchronization signal does not comprise three logic ones, the program mode is exited. However, when block 95 determines that the synchronization signal comprises three logic ones the code word sequence comprising the ten code words 1 through 10 held in block 90 and the newly received ten code words 11 through 20 are stored in an area of memory 79 which is allocated to the storage of twenty code word sequences. After the storage of the two-frame code word sequence in memory 79, the program mode is again exited. Entering the program mode a number of times with different transmitters permits the storage of a number of possible code words in memory 79. The present embodiment permits the storage of one-ten code word sequence and four-twenty code word sequences.

It should be mentioned that FIG. 6 shows the receipt of the code sequences only once before they are stored in memory 79. It may be desirable to require that an incoming code sequence be received multiple times before it is stored as a permitted sequence. An arrangement for requiring multiple valid code sequences in a substantially similar environment as described in detail in the aforementioned C. Heitschel, et al., patent.

Figure 7:
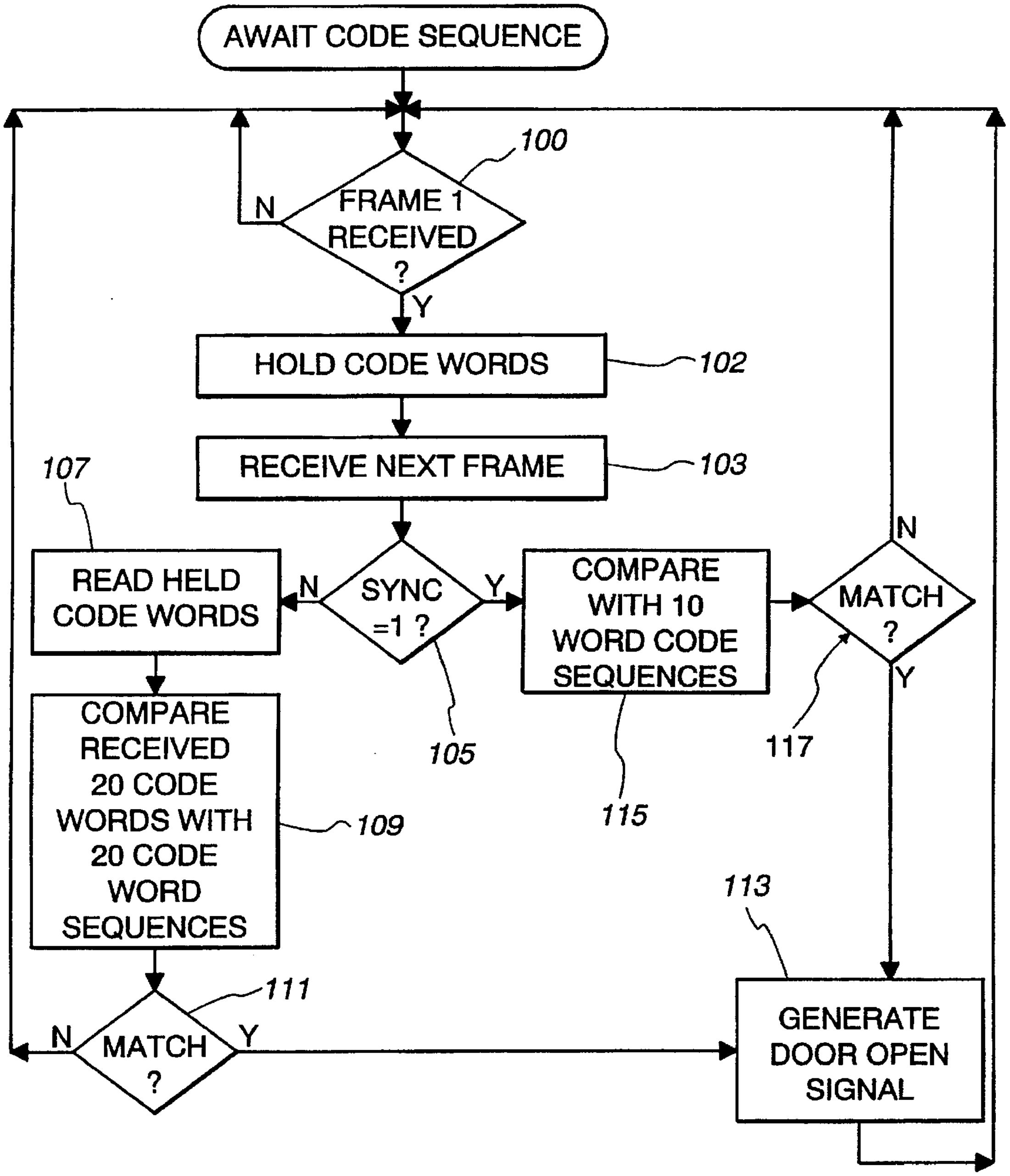
FIG. 7 is a flow diagram of the operation of receiver of FIG. 4 when a security code is received.

FIG. 7 is a flow diagram of the normal operation of the receive unit of FIG. 5 in which the receive unit awaits an incoming code sequence for possible door actuation. This mode begins at block 100 where a valid frame one is awaited. When a valid frame 1 is received in block 100, flow proceeds to a block 102 where the 10 code words received are temporarily stored and the flow proceeds to a block 103 awaiting the next received frame. Block 105 is performed after a next frame is received to determine if the received frame is a frame 2 or a second occurrence of frame 1. The distinction is made by an evaluation of the length of the synchronization signal. When the synchronization signal indicates in block 105 that a frame 2 has been received the code words held in block 102 are read in block 107 and the twenty code words comprising the received frame 1 and frame 2 are compared (block 109) with the permitted twenty code word sequences stored in memory 79. When a match is determined (block 111) between the received 20 code word sequence and a stored 20 code word sequence, flow proceeds to a block 113 where an actuation signal is generated to open a door. Alternatively, when block 111 determines that the received twenty code word sequence does not match a stored permitted twenty code word sequence, control returns to block 100 to await the reception of a new frame 1.

When block 105 determines that a second frame 1 has been received after a first frame 1, the ten code words of the received frame 1 are compared (block 115) with the ten code word sequences stored in memory 79. When a match occurs, the flow proceeds from block 117 to block 113 where an actuation signal is generated. If no match is found in block 117, the flow of control returns to block 100 where a new frame 1 is awaited.

The transmitter as shown in FIG. 3 includes a code word source 59 which permanently and non-changeably stores the 20 code words to be transmitted as a code sequence. It may be desirable to permit some limited amount of user programmability of the codes being transmitted. For example, when two actuating receivers are employed in close proximity to one another, it may be desirable to control them independently from the same transmitter. This would be impossible when only a permanent preassigned sequence of code words could be transmitted from the transmitter.

Figure 8:
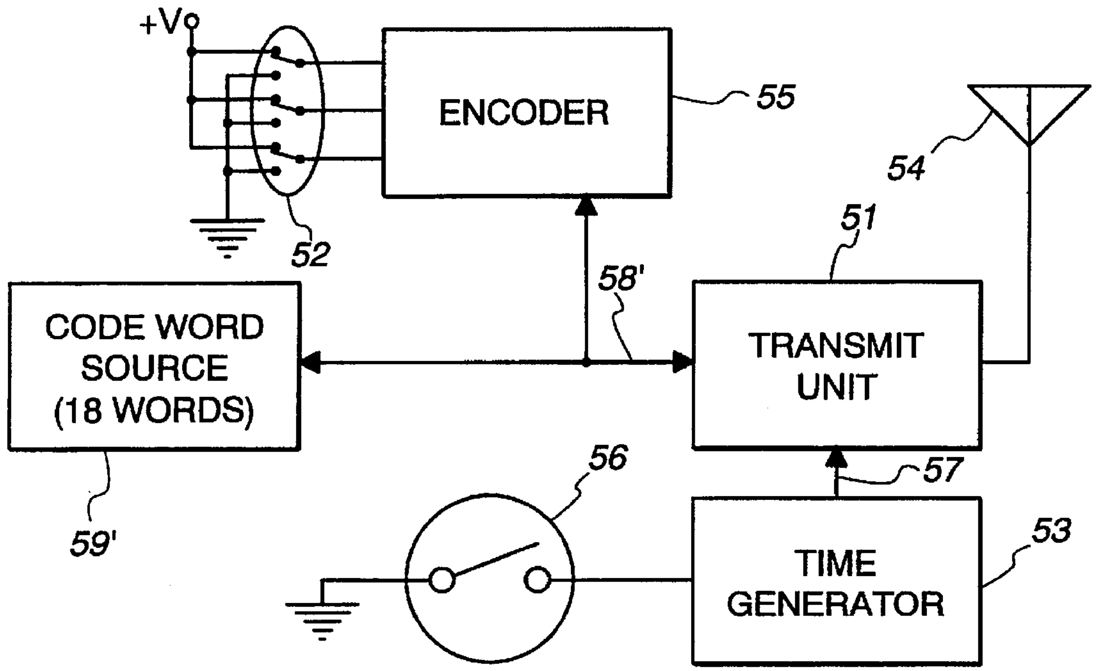
FIG. 8 is a block diagram of an alternative transmitter embodiment to that shown in FIG. 3.

FIG. 8 is a block diagram of an alternative embodiment of the transmitter which allows user programmability. This transmitter is in large measure the same as transmitter of FIG. 3 and components given the same numeral as FIG. 3 operate in substantially the same manner. The transmitter of FIG. 8 includes three switches 52 and an encoder 55 which is connected to transmitter 51 via a bus 58'. A code word source 59' permanently stores 18 code words.

The armatures of switches 52 are selectively and individually connectable between ground and a positive voltage and depending on operator placement apply either ground or the positive voltage to encoder 55. Encoder 55 generates two of the three state words shown in Table 1 with respect to each possible combination of the settings of switches 52. The two code words produced by encoder 55 are used by transmitter 51 as code words 1 and 11 of the code word sequence transmitted to the receiver via antenna 54.

The flow diagram of FIG. 4 represents generally the operation of the transmitter embodiment shown in FIG. 8. During step 64 of the flow diagram, word 1 is read by transmitter 51 from encoder 55 and words 2 through 10 are read by transmitter 51 from code word source 59'. In step 70 of the flow diagram of FIG. 4, code word 11 is read by transmitter 51 from encoder 55 and the code words 12 through 20 are successively read from code word source 59'. Thus, depending on the positions of switches 52 up to eight unique control word sequences can be transmitted by the transmitter of FIG. 8.

When the transmitter of FIG. 8 is to be used with multiple receivers, each receiver is programmed to receive a code transmitted with a different pattern of switch 52 positions. After the receivers have been programmed, an operator with a transmitter of the type shown in FIG. 8 can set the position of switches 52 to the appropriate position for the desired receiver and then press push-button 56 to transmit the resultant code to the receiver which will respond by generating an activating signal. The operator can then change the position of one or more switches 52 and again press button 56 to cause another receiver to generate an actuating signal. The system of the type shown in FIG. 8 would be extremely useful with a pair of separately controlled garage doors where one of the switches 52 could be set to one position for the left door and set to the other position for the right door. In this way, both doors can independently be controlled from the same transmitter.

Figure 9:
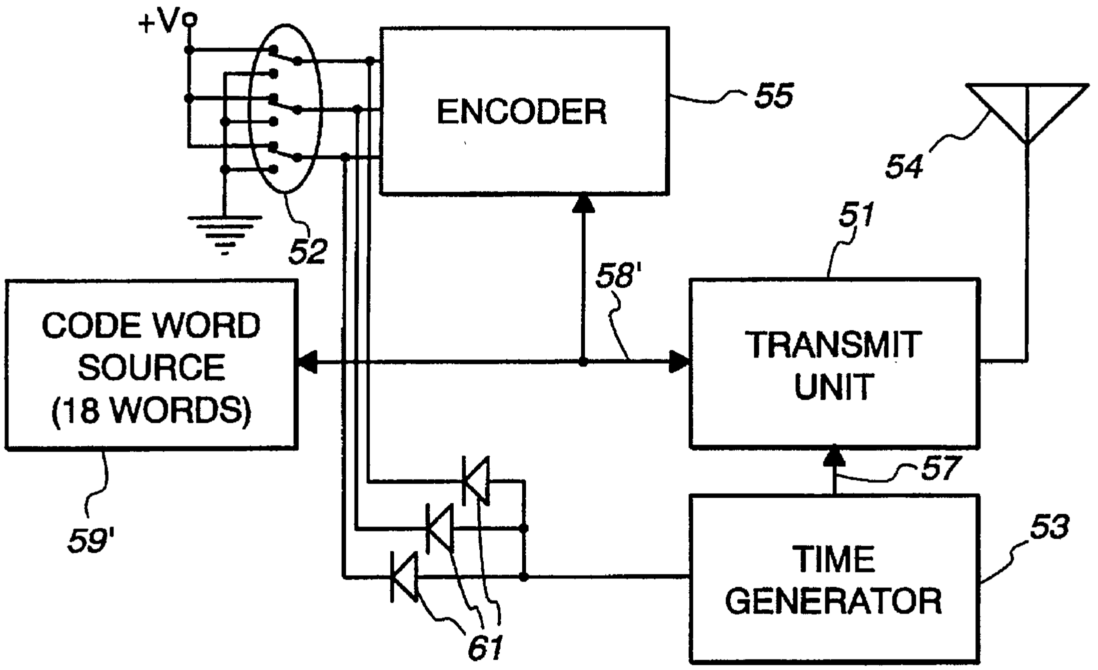
FIG. 9 is a block diagram of an alternative transmitter to that shown in FIG. 8.

FIG. 9 represents an additional embodiment of a code transmitter of the type shown in FIG. 8 which operates without a separate transmit switch 56. In this embodiment switches 52 are momentary contact push-button switches, the armatures of which are connected to the positive voltage when not pressed. When any of the switches 52 is pressed, a grounded input is presented to encoder 55 and, via one of a plurality of diodes 61, to the time generator 53. The grounded input to time generator 53 starts the previously described timing cycle which controls the transmission of a code word sequence comprising 18 code words stored by code word source 59' and two code words derived by encoder 55 from the positions of switches 52.

While preferred embodiments of the invention have been illustrated, it will be obvious to those skilled in the art that various modifications and changes may be made thereto without departing from the scope of the invention set forth in the attached claims.

What is claimed is:

1. In a remote actuating system comprising a first transmitter for repetitively transmitting a first code word sequence comprising a first frame of code words, a second transmitter for repetitively transmitting a second code word sequence comprising a first frame of code words and a second frame of code words, wherein each of said first frames comprises a first identity character identifying the first frame and a first predetermined number of code words and each of said second frames comprises a second identity character distinct from the first identity character, identifying the second frame and a second, predetermined number of code words, and a remotely operated receiver for generating actuation signals to control the position of a barrier, a method of operating said receiver comprising:

storing at least one first code word sequence comprising the first predetermined number of code words in said receiver;

storing separately from said first code word sequence at least one second code word sequence comprising a number of code words larger than the first predetermined number of code words in said receiver;

receiving a first frame of code words;

receiving another frame of code words after the receipt of said first frame, said another frame of code words being either a repeat of the first frame or a second frame of code words;

determining from said identity character of said another frame of code words whether said another received frame of code words is one of said first frames or one of said second frames;

comparing said received first frame of code words with a stored first code word sequence only when said another received frame of code words is determined in said determining step to comprise a first frame of code words;

comparing a combination of the code words of said received first frame and said another received frame with a stored second code word sequence only when said another received frame of code words is determined in said determining step to comprise a second frame of code words; and generating, responsive to said comparing steps, an actuation signal when the compared code words comprise a code word sequence identical to a code word sequence compared thereto.

2. The method of claim 1 comprising a step of actuating a garage door responsive to said generating step.

3. The method of claim 1 wherein both said first and said second identity characters convey synchronizing information and said method comprises synchronizing the receiver to the first and second identity characters when received.

4. The method of claim 1 wherein the first code word sequence comprises m code words and the second code word sequence comprises 2 m code words.

5. In a remote actuating system comprising a first transmitter for repetitively transmitting a first code word sequence comprising a first frame of code words, a second transmitter for repetitively transmitting a second code word sequence comprising a first frame of code words and a second frame of code words, wherein each of said first frames comprises a first identity character identifying the first frame and a first predetermined number of code words and each of said second frames comprises a second identity character distinct from the first identity character, identifying the second frame and a second predetermined number of code words, and a remotely operated receiver for generating actuation signals to control the position of a barrier, said system comprising:

means for storing at least one first code word sequence comprising the first predetermined number of code words in said receiver;

means for storing separately from said first code word sequence at least one second code word sequence comprising a number of code words larger than the first predetermined number of code words in said receiver;

means for receiving a first frame of code words;

means for receiving another frame of code words after the receipt of said first frame;

means for determining from said identity character of said another frame of code words whether said another received frame of code words is a first frame or a second frame;

means for comparing said received first frame of code words with a stored first code word sequence only when said another received frame of code words is determined in said determining step to comprise a first frame of code words;

means for comparing a combination of the code words of said received first frame and said another received frame with a stored second code word sequence only when said another received frame of code words is determined in said determining step to comprise a second frame of code words; and means for generating, responsive to said comparing steps, an actuation signal when the compared code words comprise a code word sequence identical to a code word sequence compared thereto.

6. The system of claim 5 wherein said identity characters comprise synchronization characters which synchronize the reception of the frames based upon the identity of said first and second identity characters.

7. The system of claim 5 wherein the barrier comprises a garage door.

8. The system of claim 5 wherein the first code word sequence comprises m code words and the second code word sequence comprises 2 m code words.

* * * * *